(12) United States Patent
Cohen et al.

(10) Patent No.: US 7,359,919 B2
(45) Date of Patent: Apr. 15, 2008

(54) RELIABLE REQUEST-RESPONSE MESSAGING OVER A REQUEST-RESPONSE TRANSPORT

(75) Inventors: Shy Cohen, Bellevue, WA (US); Kirill Gavrylyuk, Redmond, WA (US); Ondrej Hrebicek, Redmond, WA (US); Richard Hill, Kirkland, WA (US); Stefan R. Batres, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 415 days.

(21) Appl. No.: 11/075,418

(22) Filed: Mar. 8, 2005

(65) Prior Publication Data

US 2006/0206558 A1  Sep. 14, 2006

(51) Int. Cl.
*G06F 17/30* (2006.01)
*G06F 15/173* (2006.01)

(52) U.S. Cl. .................... 707/104.1; 709/223; 709/225
(58) Field of Classification Search ............... 709/225, 709/223; 707/104.1, 9
See application file for complete search history.

(56) References Cited

U.S. PATENT DOCUMENTS

| | | | |
|---|---|---|---|
| 5,604,487 A * | 2/1997 | Frymier | 340/5.9 |
| 5,897,657 A * | 4/1999 | Hagersten et al. | 711/145 |
| 6,543,005 B1 * | 4/2003 | Bamford | 714/18 |
| 6,651,099 B1 * | 11/2003 | Dietz et al. | 709/224 |
| 6,772,216 B1 * | 8/2004 | Ankireddipally et al. | 709/230 |
| 7,099,950 B2 * | 8/2006 | Jones et al. | 709/230 |

OTHER PUBLICATIONS

Shiva, Sajjan G., et al. *Implementation of Reliable and Efficient Remote Procedure Calls*, Computer Science Department, University of Alabama in Huntsville, Apr. 1993.
Rojviboonchai, Kultida and Aida, Hitoshi, *An Evaluation of Multipath Transmission Control Protocol (M/TCP) with Robust Acknowledgement Schemes*, Online Proceedings on Internet Conference, Oct. 2002.
Lee, Sangmi and Fox, Geoffery, *Wireless Reliable Messaging for Web Services (WS-WRM)*, Proceedings of the IEEE International Conference on Web Services, San Diego, California, Jul. 6, 2004.
Williams, Carey L. and Cheriton, David R. *An Overview of VMTP Transport Protocol*, Local Computer Networks; Proceedings 14th Conference in Minneapolis, MN, Oct. 10, 1989.

(Continued)

*Primary Examiner*—Pierre Vital
*Assistant Examiner*—E. J Kennedy
(74) *Attorney, Agent, or Firm*—Workman Nydegger

(57) ABSTRACT

A reliable request-response mechanism allows a requesting computer system and a responding computer system in an established end-to-end connection to send and receive messages in a manner that the responding computer system processes a request as intended by the requesting computer system, such that all the message communication is initiated by the requesting computer system. The requesting computer system and responding computer system can accommodate a wide range of messaging failures, such as intermittent network connections or failure of a transport of SOAP intermediary by resending cached versions of previously sent messages, and by acknowledging receipt of each message received. Cached messages on either computer system are deleted after being appropriately acknowledged. After all sent messages have been acknowledged by the responding computer, and the requesting computer has received all of the response messages from the responding computer, the end-to-end connection is terminated with an exchange of connection termination messages.

20 Claims, 5 Drawing Sheets

OTHER PUBLICATIONS

Ibbotson, J. and King, R. *Requirements for Reliable Message Delivery Draft-ibbotson-reliable-messaging-reqts-00.txt*, IETF Standard Working Draft, Internet Engineering Task Force, Nov. 12, 2001.

Watson, Richard W., *Timer-Based Mechanisms in Reliable Transport Protocol Connection Management*, North-Holland Publishing Company, Computer Networks. vol. 5, No. 1, Feb. 1981.

* cited by examiner

RELIABLE REQUEST-RESPONSE MESSAGING OVER A REQUEST-RESPONSE TRANSPORT

CROSS-REFERENCE TO RELATED APPLICATIONS

N/A

BACKGROUND OF THE INVENTION

1. The Field of the Invention

This invention relates to systems, methods, and computer program products for communicating messages reliably using a request-response transport.

2. Background and Relevant Art

As computerized systems have increased in popularity, so did the needs to distribute files and processing resources of computer systems in networks both large and small. In general, computer systems and related devices communicate information over a network for a variety of reasons, for example, to exchange personal electronic messages, sell merchandise, provide account information, and so forth. One will appreciate, however, that as computer systems and their related applications have become increasingly more sophisticated, the challenges associated with sharing data and resources on a network have also increased.

Generally, there are a number of different mechanisms and protocols for distributing files and resources between two or more computer systems. For example, messages can be sent from one computer system to one or more other computer systems in a manner that does not necessarily require the other computer systems to respond. An example of this might be connectionless protocols, such as might be used with sending electronic mail messages, or streaming certain content to other computers using a user datagram protocol ("UDP"). Other methods for sharing files or resources can include use of connection-oriented protocols, such as those using a transmission control protocol ("TCP"). Connection-oriented communication typically involves establishing a connection through a series of requests and responses, and by sharing certain connection state information. Data sent to and received from the computers usually has some element that associates the transmitted data with the connection.

Connection-oriented communication has a number of advantages that distinguish it from connection-less communication for certain applications. For example, connections initiated using TCP provide a number of functions for ensuring that all the data have been received at one end, as well as a certain amount of error correction. For example, a sending computer can send a packet that indicates it is the first of 20 packets. After the receiving computer receives all 20 packets in the connection session, it submits an acknowledgement (or "ack") to the sending computer system to indicate that all 20 packets were received. In some cases, the receiving computer system may even send an ack for each packet that it has received. In the case of using a reliable messaging ("RM") mechanism, if the sending computer system does not receive an ack for each packet, or an ack for all 20 packets, the sending computer system may send the entire message again, or may even resend individual packets to the receiving computer as necessary.

As such, a number of different framing protocols, such as Hypertext Transfer Protocol ("HTTP") and File Transfer Protocol ("FTP") are each layered on top of connection-oriented transport protocols to take advantage of one or more of these aforementioned attributes. For example, when a client computer uses HTTP to retrieve information, the client computer establishes a TCP connection with the web server and sends an HTTP request for a resource, such as an HTML file or an image, or request that the web server takes a certain action, for example, in the case of online commerce where the client may ask the web server to purchase a song online and send it to the client. The web server receives the request and provides a corresponding response, which may include the contents of the requested file. After receiving the requested files, or when the client computer decides that the communication with the web server is completed, the client computer shuts down the TCP connection. As such, the client does not need to be addressable from the service's standpoint. For example, the client can be behind a Network Address Translation (NAT) server, or utilize an HTTP Proxy to bridge the connection across a firewall. Another benefit is that the requests and the responses are easily correlated—each response correlates to the request that preceded it.

Despite these and other advantages of request-response mechanisms, there is generally no particular way for a requesting or responding computer system to know that the information was transferred successfully. For example, a request may have reached the server, and the server may have produced a response, but the response was lost due to an HTTP Proxy error. Therefore, it is common in a conventional request-response mechanism for the requesting computer system to retransmit the request where no response has been received from the other computer system. For example, conventional web browsers often provide a "refresh" button that can be used to retry the HTTP request when a web page fails to load, In some cases, such as with a simple request for an Internet web page, repeating a seemingly failed request will not ordinarily have a detrimental effect. In other cases, such as with non-idempotent operations, repeating a seemingly failed request, or retransmitting a message that appears not to have been sent properly can have an aggregated effect, which may be detrimental. For example, a client computer might retransmit a money transfer request to a bank server due to no response from the bank server to indicate that the original money transfer was successful. The absence of a response does not necessarily indicate that the request was not received or processed. For example, the request might have been received and processed, but the response was lost due to a temporary network disconnection, or an HTTP Proxy failure. The bank might therefore double the amount of the money transfer upon retrying the request, though this was not intended by the client.

Difficulties such as these can be particularly acute in connections where the responding computer system (e.g., a bank server) cannot communicate directly with the requesting computer system (e.g., client bank customer) to let it know of the status of the request. For example, the client computer system might be communicating anonymously in the connection, or might be behind a firewall, or might be subject to a network address translation ("NAT") service. In cases such as these, typically only the client, or requesting, computer system can initiate the communication. This can create difficulties for the responding computer system (e.g., a network server) in the event where it might be desirable to send receipt acknowledgements and response retransmissions to the requestor. In particular, there is presently no efficient mechanism in conventional request-response protocols for ensuring reliable message transfer between two or more computer systems, particularly such that does not aggregate the effect of messages where such an effect should not be aggregated, and that allows messages to be processed only in a particular order as desired.

Accordingly, systems, methods, and computer program products that ensure reliable request-response mechanisms would be an advantage in the art. In particular, an advantage can be realized with request-response mechanisms that allow efficient request and response messages, and corresponding acknowledgements of the same, between a requesting and responding computer system of a network connection. Furthermore, an advantage can be realized with efficient request-response mechanisms that can be implemented whether the address of the requesting computer can be identified, in a connection where the address is difficult or impossible to determine, or in cases where such address impossible to connect to from the server.

BRIEF SUMMARY OF THE INVENTION

The present invention solves one or more of the foregoing problems in the prior art with systems, methods, and computer program products configured to ensure reliable messaging in a request-response environment. In particular, implementations of the present invention relate in part to specific request and response mechanisms that place constraints on a responding computer system to process messages sent by a requesting computer system only in a manner that is intended.

For example, one method from a requesting computer system perspective includes establishing an end-to-end connection with a responding computer system. In one implementation, the end-to-end connection is established with a connection contract that indicates how processing is to occur at the responding computer system. The method also includes sending a first message to the responding computer system, where the first message includes a first identifier. The method from the requesting computer system also includes receiving a response message from the responding computer system.

In addition, when all request and response messages have been appropriately acknowledged, the method from the requesting computer system perspective also includes sending a connection termination message to the responding computer system. In one implementation, the termination message can include a termination message identifier, and an acknowledgement that all the response messages sent by the responding computer system have been received. Thereafter, the end-to-end connection is terminated when the requesting computer system receives a termination response message that relates to the termination message identifier.

By contrast, a method from the responding computer system perspective includes accepting an end-to-end connection with the requesting computer system. In one implementation, this also involves a contract that directs the way in which received messages will be processed. The method from the responding computer system perspective also includes receiving a first message from the requesting computer system, where the first message includes a first identifier. The responding computer system then sends to the requesting computer a response message.

After all the appropriate response messages have been received by the requesting computer system, the responding computer system receives a connection termination message from the requesting computer system. The termination message will typically include a termination message identifier, and an acknowledgement from the requesting computer system that all the response messages were received. The responding computer system then sends a termination response message that relates to the termination message identifier. Accordingly, both the requesting and responding computer systems acknowledge receipt of specific messages in the end-to-end connection.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and computer program products configured to ensure reliable messaging in a request-response environment. In particular, implementations of the present invention relate in part to specific request and response mechanisms that place constraints on a responding computer system to process messages sent by a requesting computer system only in a manner that is intended.

As will be understood from the present specification and claims, one aspect of the invention relates to establishing an end-to-end connection between a requesting computer system and a responding computer system that uniquely identifies messages from both computer systems. Another aspect of the invention relates to sending request messages to the responding computer system that are followed up with response messages from the responding computer system.

The responding computer system acknowledges request messages from the requesting computer system, and the requesting computer system acknowledges response messages from the responding computer system. A further aspect of the invention relates to terminating the communication in a way that also implements a termination acknowledgment message from the responding computer system.

Figure 1:
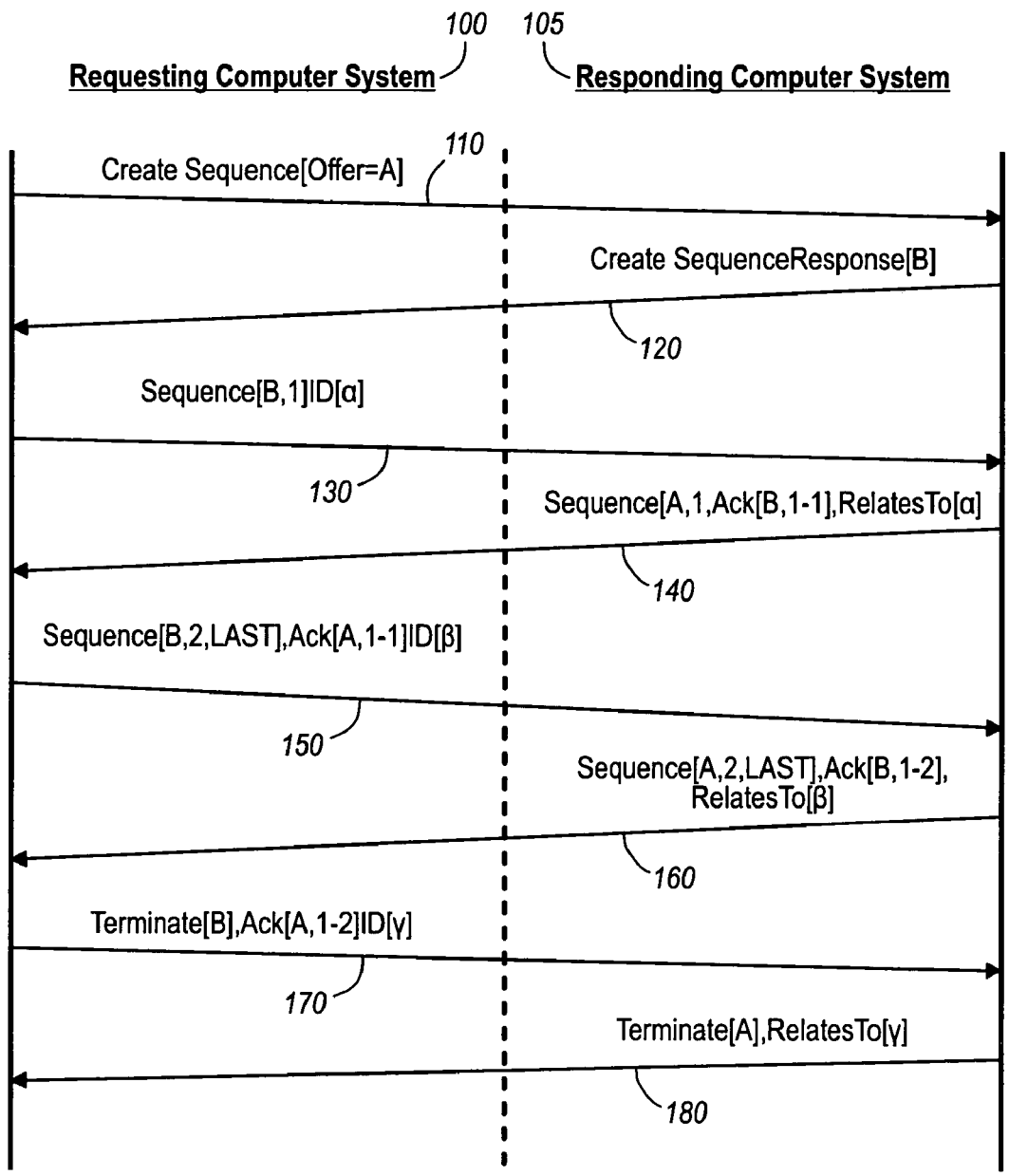
FIG. 1 illustrates a request-response series in accordance with the present invention in which messages sent by a requesting computer system are appropriately acknowledged by the responding computer system.

For example, FIG. 1 illustrates a request-response series in accordance with the present invention in which all messages sent by requesting computer system 100 are appropriately acknowledged by the responding computer system 105, and vice versa. In general, the end-to-end connection described herein can be layered on top of any type of network connection that provides for request-response interaction, such as TCP and the like, upon which are layered request-response framing protocols such as HTTP, and so on. There are, of course, other request-response transport and framing protocols that can be practiced in accordance with the present invention.

In any event, FIG. 1 shows that requesting computer system 100 initiates an end-to-end connection by sending a connection initiation request message 110 "Create Sequence [Offer=A]" to the responding computer system 105. This end-to-end connection can persist over one or more underlying network connections, such that there could be one or more transport connections between the requesting computer system 100 and responding computer system 105 at the same time, distinguished using the end-to-end connection identifiers. The request message 110 includes an identification "A" that will be used by responding computer system 105 for all the messages in the end-to-end connection. FIG. 1 also shows that responding computer system 105 accepts the connection with a response 120 "Create SequenceResponse[B]" for the established connection. Response message 120 includes identification "B", which will be used by requesting computer system 100 for all messages it sends in the established end-to-end connection.

When, or before, establishing an end-to-end connection between the requesting computer system 100 and responding computer system 105, the two computers can also set up a connection "contract". For example, connection request message 110 can include an identification of a connection contract (not shown), which is agreed to in message 120. The connection contract can include any number of instructions that can be configured for any number of ends. For example, in one implementation, the connection contract requires that each message received by the responding computer system 105 be processed "exactly once", or "not more than once", or "at least once".

In another implementation, the connection contract indicates that processing takes place in an ordered fashion, or only after requesting computer system 100 has acknowledged receipt of all response messages from responding computer system 105. For example, the responding computer system 105 may be required to cache all received messages; and, after all messages have been received (in whatever order) and appropriately acknowledged by requesting computer system 100, responding computer system 105 can then process the received messages in a particular order. Responding computer system 105 would then prepare responses that would be pulled at a later time by the requesting computer system 100.

After the end-to-end connection (and related contract) is established, requesting computer system 100 sends to responding computer system 105 a first message 130 of the end-to-end connection. First message 130 "Sequence[B,1] ID[α]" includes the identifier "B", which was provided by the responding computer system 105 in message 120. Message 130 also includes a sequential number "1" (i.e., "B,1") for first message 130, and a separate first identifier "α". First identifier "α" uniquely identifies message 130 apart from the relative sequence number "1" of first message 130. Upon receiving first message 130, responding computer system sends response message 140 "Sequence[A,1],Ack[B1-1], RelatesTo[α]", which relates to the first identifier "α" and includes an acknowledgment "Ack[B1-1]", which indicates which request messages have been received by the responding computer system 105.

In one implementation, such as when requests and responses are correlated at the transport level of the communication stack, response message 140 can be sent to requesting computer system 100 only on the reply leg of the transport connection used to deliver first message 130. In another implementation, such as when requests and responses are correlated at the message level of the communication stack, response message 140 can be returned to requesting computer system 100 on any reply leg of any transport connection established by requesting computer system 100. This is possible in one implementation because messages correlated at the messaging layer may include some correlating information for requesting computer system 100 that will allow it to match the response message to a request message it sent previously. For example, a reply message from the responding computer system 105 may have failed, and a subsequent acknowledgment attached to a later reply will have indicated that the prior request was actually received. As such, requesting computer system 100 can send an acknowledgment message for the last reply, indicating that a previous reply was lost. Responding computer system 105 can use the reply leg of the acknowledgment message received from requesting computer system 105 to retransmit the reply message, and provide the correlation information in the message (e.g. "RelatesTo[α]").

In any event, FIG. 1 shows that response message 140 includes the identification "A,1", which indicates that message 140 is the first message ("1") sent by responding computer system 105 for the established end-to-end connection ("A"). Response message 140 also includes an acknowledgement "Ack[B1-1]", which acknowledges that responding computer system 105 has messages 1 through 1 sent on the end-to-end connection identifier "B" used by the requesting computer system 100. Response message 140 also indicates that message 140 relates to (i.e., "RelatesTo") the first identifier "α", which indicates to requesting computer system 100 that message 140 is a response to the first request message (i.e., "ID[α]").

Requesting computer system 100 also sends second message 150 "Sequence[B,2,LAST],Ack[A1-1]ID[β]". Second message 150 includes an identification "B,2", which indicates that message 150 is the second message sent by computer system 100 on its identifier for the established end-to-end connection (i.e., "B"). Second message 150 also includes an identifier "LAST", which indicates that message 150 is the last of the application messages to be sent by computer system 100 on its identifier "B" for the established end-to-end. Second message 150 further includes an acknowledgement "Ack[A,1-1]", which acknowledges to responding computer system 105 that requesting computer system 100 has received reply message 140. In addition, second message 150 includes a second identifier "β" that specifically identifies message 150, without regard to its ordinal number in the sequence (i.e., "B,1", "B,2", etc.) in which it was sent.

As such, FIG. 1 shows that responding computer system 105 receives message 150, and replies with a response message 160 "Sequence[A,2,LAST],Ack[B,1-2],RelatesTo [β]". Response message 160 includes an identification "A,2, LAST", which indicates that message 160 is the second acknowledgement message sent by responding computer system 105 with its identifier "A" for the established end-to-end connection; and that message 160 is the "last" message sent on the receiving computer system's identifier ("A") for the established end-to-end connection. Response message 160 further includes an acknowledgement "Ack [B.1-2]", which identifies that responding computer system 105 has received sequentially numbered messages 1 through 2 on the end-to-end connection identifier used by requesting computer system 100 ("B"). In addition, response message 160 includes the second identifier "β", which indicates to requesting computer system 100 this is a response to the second request message 150 (i.e., "ID[β]") sent previously.

Upon receiving response message 160, requesting computer system 100 determines that the message exchange concluded successfully, and initiates steps to terminate the established end-to-end connection. In particular, FIG. 1 shows that requesting computer system 100 sends a connection termination message 170 "Terminate[B],Ack[A,1-2]ID[γ]". Connection termination message 170 includes identifier "B" to identify the end-to-end connection being terminated, and also includes an acknowledgement "Ack[A, 1-2]". The acknowledgement "Ack[A,1-2]" indicates that requesting computer system 100 has received both of the first and second response messages (i.e., 140, 160) from responding computer system 105. Connection termination message 170 also includes a termination message identifier "γ", which, uniquely identifies message 170.

Responding computer system 105 replies with a termination response message 180 "Terminate[A],RelatesTo[γ]". Response acknowledgement 180 includes the identifier "A" that indicates which end-to-end connection is being terminated. Response acknowledgement 180 also includes an indication that it "RelatesTo" the termination message identifier "γ". This may be used to confirm to requesting computer system 100 that responding computer system 105 actually received specific connection termination message 180. Accordingly, FIG. 1 shows that requesting computer system 100 and responding computer system 105 do more than simply provide generic acknowledgements of a message or set of messages received. In particular, requesting and responding computer systems in an established end-to-end connection can provide rich message information, which can be used to correlate specific messages with specific acknowledgements of those messages, and certain orders of processing.

Figure 2:
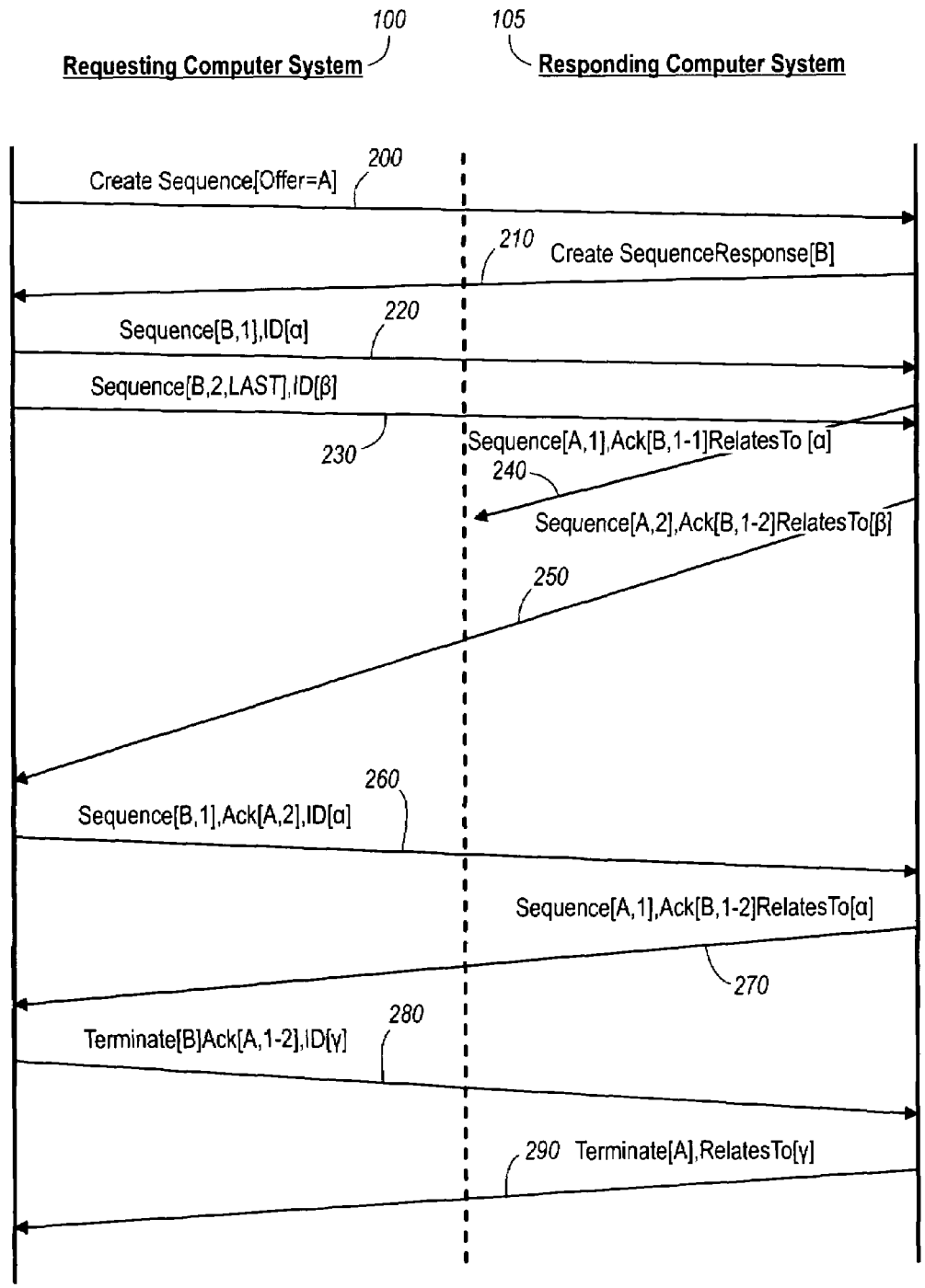
FIG. 2 illustrates a request-response series in accordance with the present invention in which at least one response message from the responding computer system fails.

FIG. 2 illustrates a request-response scenario similar to FIG. 1, except that one of the response messages from responding computer system 105 has failed. In particular, FIG. 2 shows that requesting computer system 100 and responding computer system 105 establish an end-to-end connection with messages 200 and 210, which are similar in effect to message 110 and 120 of FIG. 1. Upon establishing the end-to-end connection, requesting computer system 100 sends first request message 220 "Sequence[B,1],ID[α]", which is similar in effect to message 130 of FIG. 1, and includes the first identifier "α". FIG. 2 also shows that responding computer system 105 sends a response message 240 "Sequence[A,1],Ack[B,1-1]RelatesTo[α]", although FIG. 2 shows that message 240 fails to reach requesting computer system 100.

Before receiving any other response messages, requesting computer system 100 sends second request message 230 "Sequence[B,2,LAST],ID[β]", which is similar in effect to message 150 of FIG. 1, except that message 230 includes no acknowledgement (e.g., "Ack[##]"). In particular, message 230 indicates to responding computer system 105 that requesting computer system 100 has received no response message (i.e., message 240a was not received), even though responding computer system 105 has sent it. Nevertheless, responding computer system 105 responds to message 230 with response message 250 "Sequence[A,2],Ack[B1-2]RelatesTo[β]". Message 250 indicates that it is a second message from responding computer system 105 (i.e., "A,2"), and that responding computer system 105 has received both messages sequentially sent from requesting computer system 100 (i.e., "B1-2"). Message 250 includes second identifier "β", which indicates to requesting computer system 100 that message 250 is a response to the second request message 230 (i.e., "ID[β]").

Before receiving any other response messages, requesting computer system 100 sends second request message 230 "Sequence[B,2,LAST],ID[.beta.]", which is similar in effect to message 150 of FIG. 1, except that message 230 includes no acknowledgement (e.g., "Ack[##]"). In particular, message 230 indicates to responding computer system 105 that requesting computer system 100 has received no response message (i.e., message 240 was not received), even though responding computer system 105 has sent it. Nevertheless, responding computer system 105 responds to message 230 with response message 250 "Sequence[A,2],Ack[B1-2]RelatesTo[.beta.]". Message 250 indicates that it is a second message from responding computer system 105 (i.e., "A,2"), and that responding computer system 105 has received both messages sequentially sent from requesting computer system 100 (i.e., "B1-2"). Message 250 includes second identifier ".beta.", which indicates to requesting computer system 100 that message 250 is a response to the second request message 230 (i.e., "ID[.beta.]").

When receiving message 260, responding computer system 105 does not necessarily reprocess the message identified as "α", but, rather, discards message 260 as part of the connection contract. For example, responding computer system 105 might discard message 260 if the connection contract requires "exactly once" or "at most once" processing. In this case, the response message would be cached until acknowledged, and would then be resent to the requesting computer system 100 in response to the retransmission. Alternatively, responding computer system 105 might process both messages 220 and 260 if the connection contract specifies for "at least once" processing. For example, message 260 may be an updated version of message 220, though the messages 220 and 260 are identical in most other respects.

In any event, FIG. 2 shows that responding computer system 105 replies with response message 270 "Sequence [A,1],Ack[B1-2]RelatesTo[α]". Response message 270 identifies (i.e., "A,1") that it is essentially a copy of first response message 240. Message 270, however, also includes an acknowledgement "Ack[B1-2]", which indicates it has received both of messages 220 and 230 sent by requesting computer system 100. In addition, the unique first identifier "α" in the "RelatesTo" field indicates to the requesting computer system 100 that response message 270 is a response to the first request message ("ID[α]").

Assuming requesting computer system 100 receives message 270 this time, requesting computer system 100 initiates steps to terminate the end-to-end connection. One will appreciate, however, that iterations of request messages 220 and 260, as well as iterations of response messages 240 and 270 may be continually resent until both computer systems have sufficiently acknowledged each other's messages. In one implementation, for example, requesting computer system 100 may be configured to wait a predetermined time (fractions of a second, seconds, minutes, etc.) for each response message before resending a previously sent request message. Alternatively, requesting computer system 100 may be configured to resend a previously sent request message whenever receiving a transmission error from an intermediate node (e.g., an HTTP Proxy Server).

However the requesting computer system 100 is configured to check on and or resend messages, responding computer system 105 is limited to processing any or all received messages in accordance with the connection contract. In any event, to close the established end-to-end connection, requesting computer system 100 sends connection termination message 280 "Terminate[B]Ack[A,1-2],ID [γ]", and responding computer system replies with termination response message 290 "Terminate[A],RelatesTo[γ]", which relates to the termination message identifier "γ". Accordingly, messages 280 and 290 serve virtually the same function as described respectively for messages 170 and 180 of FIG. 1.

Figure 3:
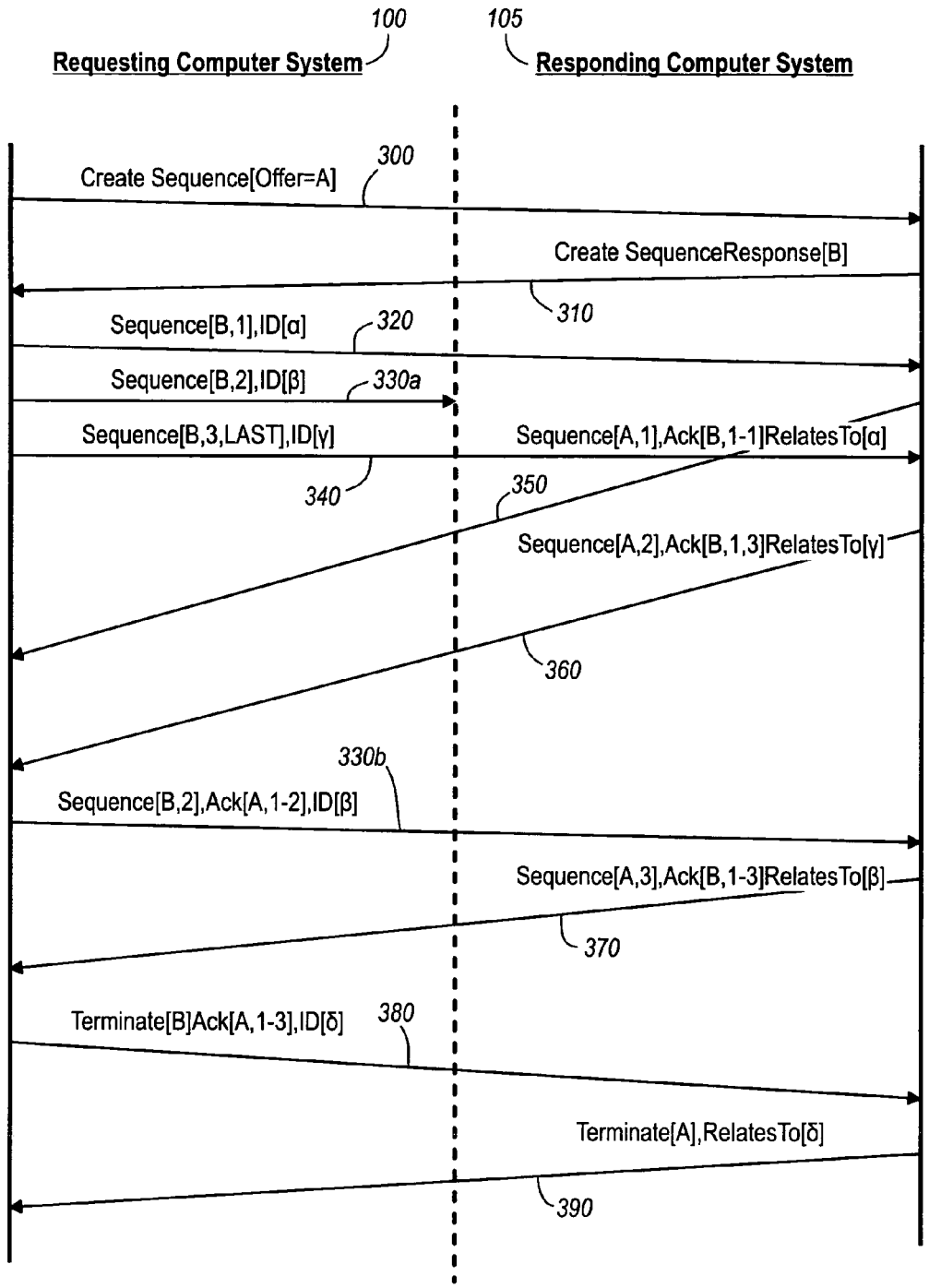
FIG. 3 illustrates a request-response series in accordance with the present invention in which at least one request message sent by the requesting computer system fails.

FIG. 3 illustrates a request-response scenario similar to the preceding Figures, except illustrating a scenario in which at least one message sent by requesting computer system 100 fails. For example, FIG. 3 shows that requesting computer system 100 and responding computer system 105 establish an end-to-end connection with respective request and response messages 300 "CreateSequence[Offer=A]" and 310 "CreateSequenceResponse[B]". Upon establishing the end-to-end connection, requesting computer system 100 sends first message 320 "Sequence[B,1],ID[α]", having a first identifier "α"; and also sends second message 330a "Sequence[B,2],ID[β]", having a second identifier "β". After receiving first message 320, and shortly after or before requesting computer system 100 sends message 330a, responding computer system 105 sends response message 350 "Sequence[A,1],Ack[B,1-1]RelatesTo[α]".

Prior to receiving message 350, requesting computer system 100 also sends third message 340 "Sequence[B,3, LAST],ID[γ]", having a third identifier "γ". None of messages 320, 330a, or 340 contain any acknowledgement indicators for the response messages, such as in FIGS. 1 and 2, since requesting computer system 100 has not yet received any response messages from responding computer system 105. Ultimately, when requesting computer system 100 receives response message 350, requesting computer system 100 immediately identifies that response message 350 was sent in response to the first message 320, identified by "ID[α]", just after receiving message 320. This identification is possible since requesting computer system 100 specified "RelatesTo[α]", which indicates message 350 is the response message for the first request message 320.

FIG. 3 also shows that responding computer system 105 sends response message 360 "Sequence[A,2],Ack[B,1,3] RelatesTo[γ]", which is only the second response (i.e., "A,2") sent by responding computer system 105. In this case, no ordering requirements were imposed by the connection contract, which allowed the third message 340 sent to be processed by responding computer system 105 before receiving the second message 330a (which failed to arrive). Message 360 also indicates that responding computer system 105 has received messages 320 and 340 using the identifier "Ack[B,1,3]". In addition, since message 360 also includes the third identifier "γ", message 360 indicates to requesting computer 100 that this reply is in response to message 340, which carried this same identifier "γ".

Since requesting computer 100 has confirmation only of the receipt of messages 320 and 340, requesting computer system 100 resends the second message 330a. In particular, FIG. 1 shows that requesting computer system 100 resends message 330a as message 330b "Sequence[B,2],Ack[A,1-2],ID[β]". Message 330b indicates it is the second message sent "B,2", and also indicates "Ack[A,1-2]" that the first and second response messages 350 and 360 have been received. Message 330b also includes the identifier "β", which was included with message 330a. Upon receiving message 330b, responding computer system 105 sends response message 370 "Sequence[A,3],Ack[B,1-3]RelatesTo[β]". Message 370 indicates that it is the third response message (i.e., "[A,3]"), and also indicates that responding computer system 105 has now received each of the three messages requesting computer system 100 has sent (i.e., "Ack[B,1-3]"). In addition, the second identifier "β" in the "RelatesTo" field of message 370 indicates to requesting computer system 100 that this message is in response to the retried request message 330b.

Since all messages have now been received and acknowledged appropriately between requesting computer system 100 and responding computer system 105, requesting computer system 100 terminates the end-to-end connection. In particular, requesting computer system 100 sends connection termination message 380 "Terminate[B]Ack[A,1-3],ID [δ]", which acknowledges each of the response messages 350, 360, and 370 with the identifier "Ack[A,1-3]", and includes a termination message identifier "δ". Responding computer system 105 then responds with a response message 390 "Terminate[A],RelatesTo[δ]" that relates to the termination message identifier "δ".

Accordingly, the schemas described herein accommodate a wide range of message transmission failures, and ensure that messages are processed as intended by the requesting computer system. In particular, the schemas described herein illustrate how messages can be processed in specified orders at a responding computer system as intended by a requesting computer system, regardless of the order in which the messages are received at the responding computer system. The present invention can also be described in terms of acts for accomplishing a method of the invention. In particular, FIG. 4 illustrates methods in a flow chart from both the requesting computer system 100 perspective and the responding computer system 105 perspective of reliably sending and receiving messages in a request-response manner.

Figure 4:
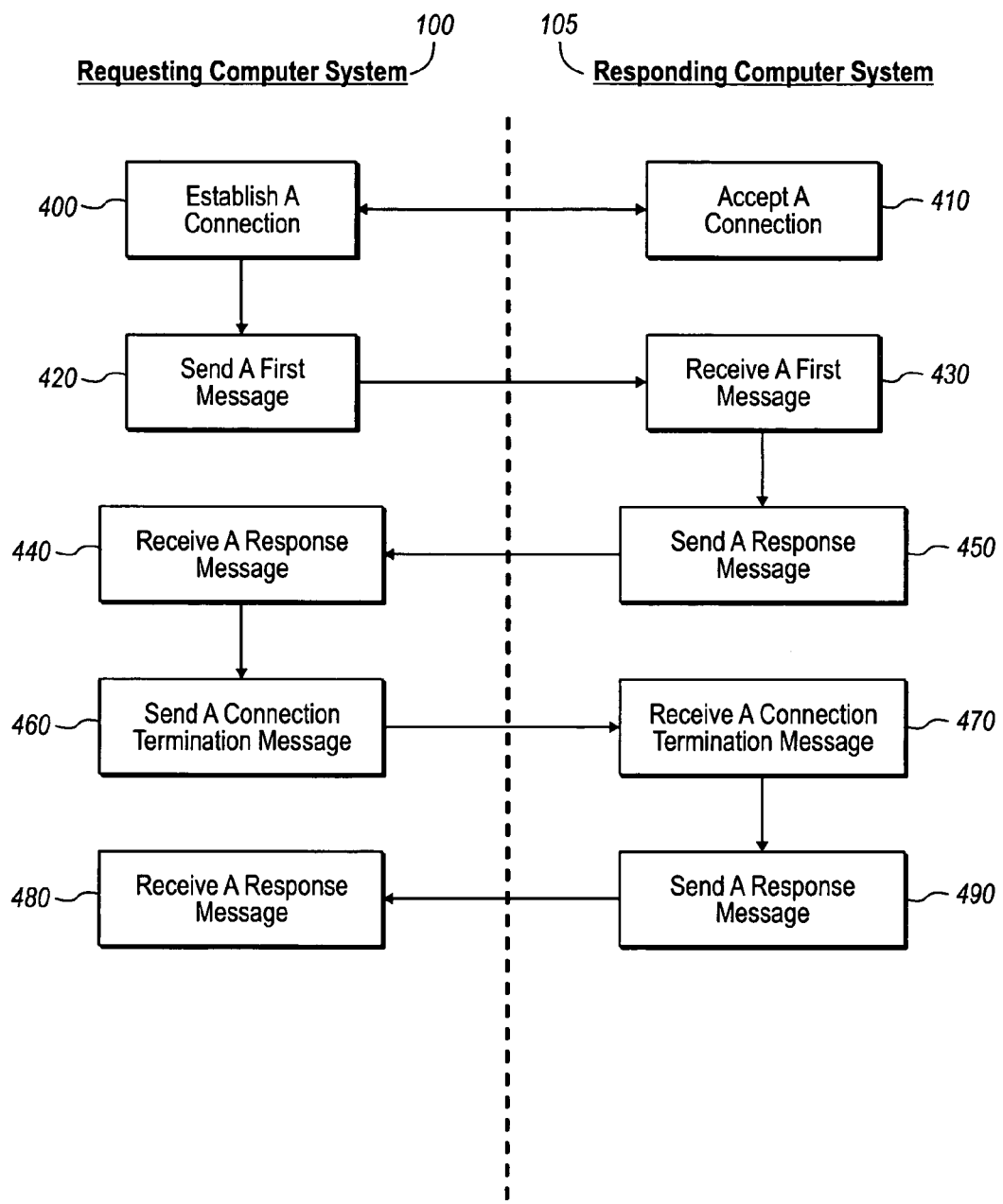
FIG. 4 illustrates a method from the requesting computer perspective and from the responding computer perspective for communicating messages and responses, and exchanging acknowledgements in a reliable request-response fashion in accordance with the present invention.

For example, FIG. 4 shows that a method from the requesting computer system 100 perspective comprises an act 400 of establishing an end-to-end connection. Act 400 also includes establishing a network connection with a responding computer system. For example, requesting computer system 400 sends message 110 "Create Sequence [Offer=A]", which can include a connection contract (not shown), which may describe how messages are to be processed in the connection by responding computer system 105. Similarly, the method from the responding computer system 105 perspective comprises an act 410 of accepting an end-to-end connection. Act 410 includes accepting an end-to-end connection with a requesting computer system. For example, responding computer system 105 accepts the end-to-end connection by sending message 120 "Create SequenceResponse[B]", which accepts the end-to-end connection under the terms of the connection contract (if one was specified).

In addition, FIG. 4 shows that a method from the requesting computer system 100 perspective comprises an act 420 of sending a first message. Act 420 includes sending a first message to the responding computer system, the first message including a first identifier. For example, requesting computer system 100 initiates a request-reply sequence by sending first message 130 "Sequence[B,1]ID[α]", which includes the first identifier "α" that uniquely identifies message 130. The corresponding method from the responding computer system 105, therefore, comprises an act 430 of receiving a first message. Act 430 includes receiving a first message from the requesting computer system, the first message including a first identifier. For example, responding computer system 105 receives message 130 "Sequence[B, 1]ID[α]" and identifies the first identifier "α". Depending on the contract that defines the established end-to-end connection, responding computer system 105 may also process message 430, or cache the contents of message 430 until further notice.

The method from the responding computer system 105 also comprises an act 450 of sending a response message. Act 450 includes sending to the requesting computer a response message. For example, after receiving message 130, responding computer system 105 processes message 130, and prepares and sends response message 140 "Sequence[A,1],Ack[B,1-1],RelatesTo[α]", which includes an indicator that message 140 relates to (i.e., "RelatesTo") first identifier "α". Accordingly, FIG. 4 shows that the method from the requesting computer system 100 perspective also comprises an act 440 of receiving a response message. Act 440 includes receiving a response message from the responding computer system. For example, the request-reply sequence is completed when requesting computer system 100 receives response message 140 "Sequence [A,1],Ack[B,1-1],RelatesTo[α]". Message 140 includes an acknowledgment indicator "Ack[B,1-1]", and a "relates to" (i.e., "RelatesTo") field, which confirm receipt of first message 130, and indicate that message 140 is in response to message 130. The request-reply sequence, however, may also be completed when determining that the first message has failed, for example, after a certain number of retries, or after a certain amount of delay in waiting for a response.

FIG. 4 also shows that the method from the requesting computer system 100 perspective comprises an act 460 of sending a connection termination message. Act 460 includes sending a connection termination message to the responding computer system, the termination message including a termination message identifier and an acknowledgement that the response message has been received. For example, requesting computer system ultimately receives a response message carrying an acknowledgement and confirmation from responding computer system 105 that all messages sent by requesting computer system 100 have been received, and also identifies that all the response messages sent from responding computer system 105 have been received. Thereafter, requesting computer system 100 sends connection termination message 170 "Terminate[B],Ack[A,1-2]ID[γ]". Connection termination message 170 also acknowledges the response messages received "Ack[A,1-2]", and includes a specific termination message identifier "γ".

Furthermore, FIG. 4 shows that the method from the responding computer system 105 perspective comprises an act 470 of receiving a connection termination message. Act 470 includes receiving a connection termination message from the requesting computer system, the termination message including a termination message identifier and an acknowledgement that the response message was received. For example, responding computer system 105 receives message 170 "Terminate[B],Ack[A,1-2][IDγ]", which acknowledges receipt of response messages 140 and 160 (i.e., via "Ack[A,1-2]"), and includes the termination identifier "γ", which uniquely identifies message 170.

In response, FIG. 4 shows that the method from the responding computer system 105 perspective comprises an act 490 of sending a response message to complete the end-to-end connection termination process. Act 490 includes sending a response termination message that relates to the termination message identifier. For example, responding computer system 105 sends termination response message 180 "Terminate[A],RelatesTo[γ]", which "RelatesTo" the termination identifier "γ" in the end-to-end connection termination message 170. Accordingly, FIG. 4 shows that method from the requesting computer system 100 perspective comprises an act 480 of receiving a termination response message. Act 480 includes receiving a termination response message that relates to the termination message identifier. For example, requesting computer system 100 receives message 180, which confirms the request to terminate the end-to-end connection, and allows requesting computer system 100 to therefore close the end-to-end connection.

The implementations described or illustrated herein can also be described in terms of system having both requesting computer system 100 and responding computer system 105 configured for exchanging messages, responses, and/or acknowledgements when appropriate. The following system example will also be described in terms of the preceding schematic Figures. That is, in a computerized environment system in which a requesting computer system sends request messages to a responding computer system, and a responding computer system responds to each request message with a response message, a method of reliably sending and receiving request messages, and for reliably sending and receiving response messages using a request-reply transport includes acts in accordance with the following.

In one instance, requesting computer system 100 establishes an end-to-end connection with responding computer system 105 by sending a connection request message (e.g., 110) to the responding computer system on the request-leg of a request-reply transport connection. In return, responding computer system 105 accepts the connection request, and provides an indication of such to the requesting computer system on the reply-leg of the request-reply transport connection. That is, responding computer system 105 sends a connection acceptance message (e.g., 120) on the reply-leg of the request-reply transport connection. After completion of this message exchange, requesting computer system 100 and responding computer system 105 have established an end-to-end connection. Requesting computer system 100 then initiates a request-reply sequence, and sends a request message (e.g., 130) using the request-leg of the request-reply transport connection it established. Requesting computer system 100 also caches the request message (e.g., 130) until the request message is acknowledged by responding computer system 105.

When the request message (e.g., 110) from the requesting computer system 100 reaches responding computer system 105, responding computer system 105 processes the request message (e.g., 110), and creates a corresponding response message (e.g., 140). The response message (e.g., 140) includes an acknowledgment (e.g., "Ack[B,1-1]") indicating that requesting computer system's 100 request message 110 was received. Similar to requesting computer system 100 with the request message (e.g., 130), responding computer system 105 also caches the response message (e.g., 140) until the response message (e.g., 140) is appropriately acknowledged by requesting computer system 100. Responding computer system 105 then sends the response message (e.g., 140) to requesting computer system 100 using only the reply-leg of the request-reply transport connection established by the requesting computer system.

The request-reply sequence for the sent message is completed when requesting computer system 100 receives the response message (e.g., 140), which includes the acknowledgment for the request message it sent (e.g., "Ack[B,1-1]"). (Alternatively, in other cases, the request-reply sequence may be completed after a determination that the request message has failed for any number of reasons.) Requesting computer system 100 then deletes the cached copy of the request message. Requesting computer system 100 also attaches an acknowledgment (e.g., "Ack[A,1-1]") for the received response message (e.g., 140) to the next message (e.g., 150) it sends to responding computer system 105.

Requesting computer system 100 and responding computer system 105 can continue to exchange further messages in the manner described above. For example, requesting computer system 100 can continue to send request messages and provide responding computer system 105 with a reply-leg of a request-reply connection for sending corresponding response messages. In addition, both requesting and responding computer systems continue to cache messages until the other computer system acknowledges the receipt of these messages (whether the originally sent message, or a retry). Furthermore, both requesting and responding computer systems also attach corresponding acknowledgments to the messages they send, so that the sent messages will indicate to the other computer system the successful receipt of the messages it sent. Still further, as messages are appropriately acknowledged, both computer systems delete the cached versions of these messages.

After all request messages have been appropriately sent and acknowledged, all the reply messages have been received, and such that any or all request-reply sequences have completed, requesting computer system 100 sends a connection termination message (e.g., 170) on the request-leg of the established request-reply transport connection, where the connection termination message (e.g., 170) includes an acknowledgement (e.g., "Ack[A,1-2]") of the all responding computer system's response messages, including the last one received (e.g., 160). Responding computer system 105 then receives the connection termination message (e.g., 170) and the accompanying acknowledgment (e.g., "Ack[A,1-2]"), and deletes the cached copy of the responses messages that have been acknowledged.

Accordingly, the schema and methods described herein provide a number of benefits related to reliable messaging using request-response transports. For example, implementations of the present invention can accommodate a wide range of messaging failures, whether at a requesting or responding computer system in an established end-to-end connection, or at one or more intermediate nodes in the connection, such as transport intermediaries (e.g. HTTP Proxy Servers) or messaging intermediaries (such as SOAP routers).

In addition, one or more implementations of the present invention include ensuring that messages that are not acknowledged appropriately can be resent, but nevertheless processed only in line with the connection contract. In one aspect this can ensure that duplicate processing can be avoided where desired, or can ensure that ordered processing can be accomplished where desired. Furthermore, implementations of the present invention allow reply message to be sent on appropriate response legs of an underlying request-reply transport, depending on whether the transport or message layers of the communication stack are correlating the messages. Yet still further, one or more implementations of the present invention can allow for acknowledgments to be expressed in the positive form (i.e. specifying the messages that were received), in the negative form (i.e. specifying missing messages), or any combination thereof.

Figure 5:
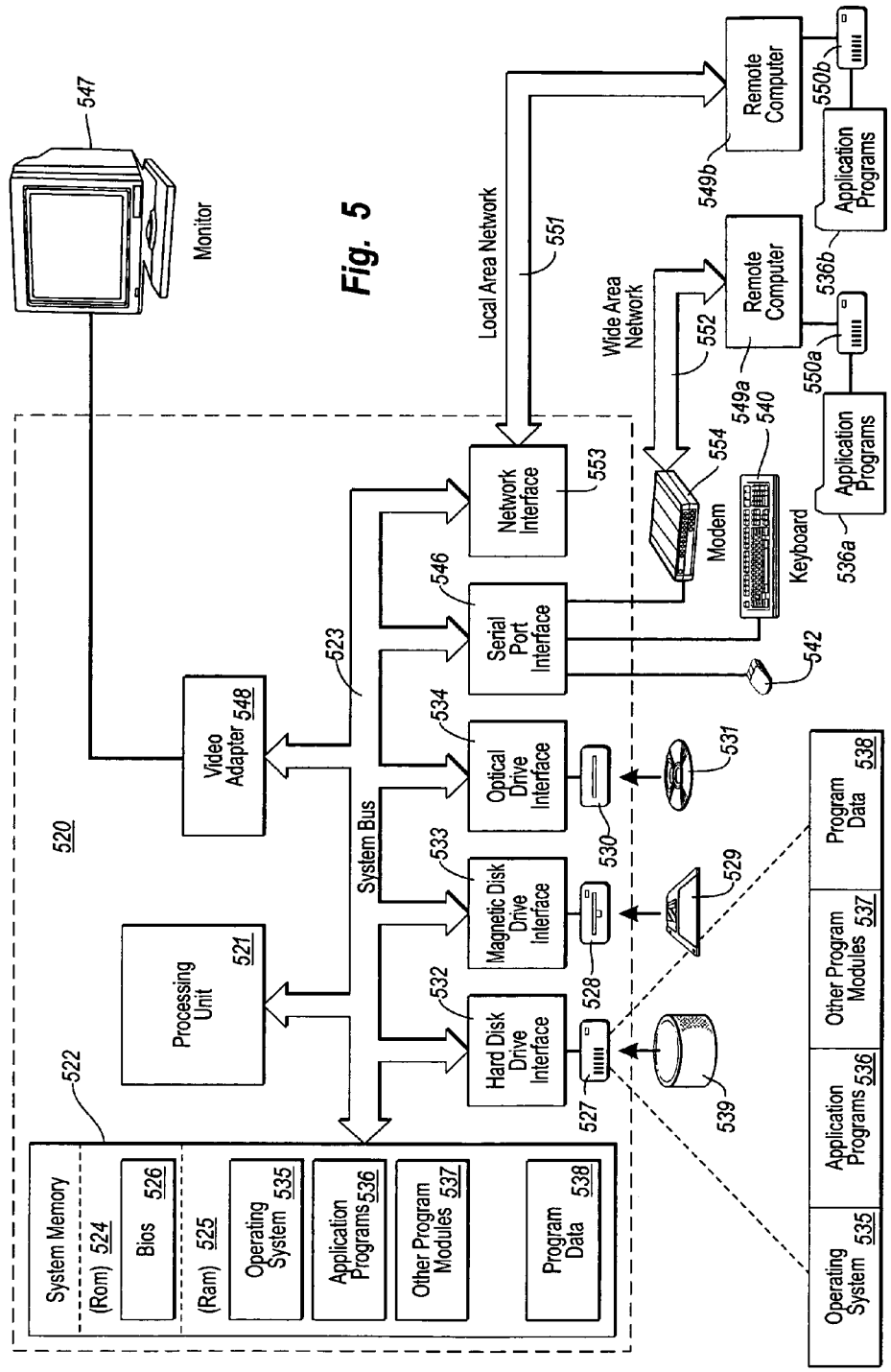
FIG. 5 illustrates a suitable computing environment for practicing one or more implementations of the present invention.

FIG. 5 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a general-purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disc drive 528 for reading from or writing to a removable magnetic disk 529, and an optical disc drive 530 for reading from or writing to removable optical disc 531 such as a CD ROM or other optical media. The magnetic hard disk drive 527, magnetic disk drive 528, and optical disc drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disc 531, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 539, magnetic disk 529, optical disc 531, ROM 524 or RAM 525, including an operating system 535, one or more application programs 536, other program modules 537, and program data 538. A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. At a requesting computer system in a computerized environment in which a requesting computer system sends request messages to a responding computer system including a unique identifier, and the responding computer system responds to each request message with a response message including a unique identifier, a method of reliably sending request messages, and for reliably receiving response messages, using a request-reply transport such that the responding computer system processes the sent messages according to specified processing instructions, comprising the acts of:

establishing a request-reply transport connection including a request leg;

sending an initial request message to a responding computer system on the request leg of the request-reply transport connection, the initial request message including the following:

a unique identifier that uniquely identifies a communication sequence;

a sequence identifier that identifies the message's place in the communication sequence; and a connection contract which describes how messages in the communication sequence initiated by the requesting computer system are to be processed by the responding computing system, the connection contract further specifying the order in which messages are to be processed, regardless of the order they are received at the responding computer system;

receiving a failure indication through a failure-indication mechanism of the request-reply transport that the initial request message has failed;

sending a cached copy of the initial request message including the unique identifier, the sequence identifier and the connection contract to the responding computer system, wherein the act of sending the cached copy of the initial request message provides the responding computer system with a reply-leg of the request-reply transport connection for sending a response message; and receiving a termination message from the responding computer system indicating that the communication sequence is complete, the termination message including a termination message identifier derived from the communication sequence's unique identifier such that the requesting computer system can verify that the termination message corresponds to the current communication sequence.

2. The method as recited in claim 1, wherein completion of the communication sequence comprises receiving a message from the responding computer system that acknowledges receipt of the initial request message.

3. The method as recited in claim 1, wherein completion of the communication sequence comprises determining that the initial request message should not be retried upon identifying one or more thresholds of failed retries, or that no response has been received after a specified time.

4. The method as recited in claim 1, wherein the failure indication is triggered by a response message to the initial request message failing to reach the requesting computer system due to a failure in the request-reply transport.

5. The method as recited in claim 4, further comprising:

receiving a different response message that acknowledges receipt of the initial request message, wherein the different response message was received through a different request-reply message exchange that concluded successfully;

receiving a different request message from the responding computer system; and sending to the responding computer system a cached copy of the initial request message that acknowledges receipt of the different response message;

wherein the act of sending the cached copy of the initial request message provides the responding computer system with a reply-leg of a request-reply transport connection on which to send a cached version of the initial response message.

6. The method as recited in claim 1, further comprising the acts of:

identifying that the initial request message was successfully sent and that no response message has been received;

repeatedly sending the cached copy of the initial request message after a specified delay interval, wherein the act of sending each cached copy of the initial request message provides the responding computer system with a reply-leg of the established request-reply transport connection on which to send an initial response message.

7. A method as recited in claim 1, further comprising the acts of:

receiving an initial response message to the initial request message;

identifying that no other request messages needs to be sent, such that a specified time interval had passed with no additional request message on which to send acknowledgment of the initial response message; and sending an acknowledgment message to the responding computer system, wherein the acknowledgment message does not contain any request.

8. The method as recited in claim 1, further comprising the acts of:

identifying through the failure-indication mechanism of the request-reply transport that the connection termination message has failed; and resending the connection termination message until the termination messaging sequence has completed.

9. The method as recited in claim 8, wherein identifying completion of the termination messaging sequence comprises receiving a connection termination response from the responding computer system on the reply-leg of the transport connection established by the requesting computer system.

10. The method as recited in claim 8, wherein identifying completion of the termination messaging sequence comprises determining failure of the connection termination sequence.

11. The method as recited in claim 10, wherein the completion of the termination messaging sequence comprises of determining that the initial request message should not be retried upon identifying one or more thresholds of failed retries, or that no response has been received after a specified time.

12. At a responding computer system in a computerized environment in which a requesting computer system sends request messages to the responding computer system, and a responding computer system responds to each request message with a response message, a method of reliably receiving request messages, and for reliably sending response messages, using request-reply transport such that the responding computer system processes the sent messages according to specified processing instructions, comprising the acts of:

receiving an initial request message on any of one or more request-reply connections from a requesting computer system through a request-reply transport, the initial request message including the following:

a unique identifier that uniquely identifies a communication sequence;

a sequence identifier that identifies the message's place in the communication sequence; and a connection contract which describes how messages in the communication sequence initiated by the requesting computer system are to be processed by the responding computing system, the connection contract further specifying the order in which messages are to be processed, regardless of the order they are received at the responding computer system;

sending a termination message to the requesting computer system only on a reply leg of any of the one or more request-reply connections indicating that the communication sequence is complete, the termination message including a termination message identifier derived from the communication sequence's unique identifier such that the requesting computer system can verify that the termination message corresponds to the current communication sequence.

13. The method as recited in claim 12, further comprising:

receiving an acknowledgement message from the requesting computer system through one of the one or more request-reply transport connections established by the requesting computer system, wherein the acknowledgement message contains no additional request message, and wherein the acknowledgement message refers to one or more previously sent response messages that were cached at the responding computer system;

identifying from the received acknowledgement message that the requesting computer system provided no request;

deleting the cached copy of the one or more response messages that were acknowledged; and sending a return acknowledgment message to the requesting computer system using a provided reply leg of the one of the one or more request-reply transport connections, wherein the return message includes no reply message, and wherein the return acknowledgement message acknowledges receipt of all previously received request messages.

14. The method as recited in claim 12, wherein a new request message has been transmitted by the requesting computer system, and wherein the responding computer system at least temporarily fails to accept or process the new request message, such that one of the one or more messages sent by the responding computer system acknowledges those previously received request messages sent by the requesting computer system, and not the new request message.

15. The method as recited in claim 12, wherein an initial request message and a subsequent request message were received and processed, and corresponding initial response and subsequent response messages were sent to the requesting computer system, the method further comprising:

receiving a new message from the requesting computer system that acknowledges receipt of only the subsequent response message; and sending to the requesting computer system a cached copy of the initial response message on the reply leg provided by the recently received new message.

16. The method as recited in claim 15, wherein the initial request message is different from a first request message that is sent by the requesting computer system, or received at the responding computer system.

17. At a requesting computer system in a computerized environment in which a requesting computer system sends request messages to a responding computer system including a unique identifier, and the responding computer system responds to each request message with a response message including a unique identifier, a computer program product having computer-executable instructions stored thereon that, when executed, cause one or more processors at the requesting computer system to perform a method of reliably sending request messages, and for reliably receiving response messages, using a request-reply transport such that the responding computer system processes the sent messages according to specified processing instructions, comprising the acts of:

establishing a request-reply transport connection including a request leg;

sending an initial request message to a responding computer system on the request leg of the request-reply transport connection the initial request message including the following:

a unique identifier that uniquely identifies a communication sequence;

a sequence identifier that identifies the message's place in the communication sequence; and a connection contract which describes how messages in the communication sequence initiated by the requesting computer system are to be processed by the responding computing system, the connection contract further specifying the order in which messages are to be processed, regardless of the order they are received at the responding computer system;

receiving a failure indication through a failure-indication mechanism of the request-reply transport that the initial request message has failed;

sending a cached copy of the initial request message including the unique identifier, the sequence identifier and the connection contract to the responding computer system wherein the act of sending the cached copy of the initial request message provides the responding computer system with a reply-leg of the request-reply transport connection for sending a response message; and receiving a termination message from the responding computer system indicating that the communication sequence is complete, the termination message including a termination message identifier derived from the communication sequence's unique identifier such that the requesting computer system can verify that the termination message corresponds to the current communication sequence.

18. The method as recited in claim 17, wherein completion of the communication sequence comprises receiving a message from the responding computer system that acknowledges receipt of the initial request message.

19. The method as recited in claim 17, wherein completion of the communication sequence comprises determining that the initial request message should not be retried upon identifying one or more thresholds of failed retries, or that no response has been received after a specified time.

20. The method as recited in claim 17, wherein the failure indication is triggered by a response message to the initial request message failing to reach the requesting computer system due to a failure in the request-reply transport.

* * * * *